US012738473B2

(12) United States Patent
Ling

(10) Patent No.: US 12,738,473 B2
(45) Date of Patent: Sep. 15, 2026

(54) EXCIMER LAMP WITH INTEGRATED HEATSINK

(71) Applicant: Feng Ling, East Brunswick, NJ (US)

(72) Inventor: Feng Ling, East Brunswick, NJ (US)

( * ) Notice: Subject to any disclaimer, the term of this patent is extended or adjusted under 35 U.S.C. 154(b) by 0 days.

(21) Appl. No.: 18/912,501

(22) Filed: Oct. 10, 2024

(65) Prior Publication Data

US 2025/0118546 A1 Apr. 10, 2025

Related U.S. Application Data

(60) Provisional application No. 63/589,309, filed on Oct. 10, 2023.

(51) Int. Cl.
*H01J 61/52* (2006.01)
*H01J 61/06* (2006.01)
*H01J 61/12* (2006.01)

(52) U.S. Cl.
CPC .............. *H01J 61/52* (2013.01); *H01J 61/06* (2013.01); *H01J 61/12* (2013.01)

(58) Field of Classification Search
CPC ............. H01J 61/52; H01J 61/06; H01J 61/16
See application file for complete search history.

(56) References Cited

U.S. PATENT DOCUMENTS 3,290,620 A * 12/1966 Wright, Jr. .............. H01J 17/04 333/13
3,949,258 A * 4/1976 Soodak ..................... G01J 3/10 313/45
9,833,526 B2 * 12/2017 Agafonov ................. A61L 2/10
2008/0258162 A1 10/2008 Koung et al.
2010/0103621 A1 4/2010 Sun
2010/0164345 A1 7/2010 Juan et al.
2012/0319578 A1 * 12/2012 Hatase .................. H01J 65/046 313/607
2023/0245880 A1 8/2023 Takeuchi et al.

FOREIGN PATENT DOCUMENTS

CN 218783005 U * 3/2023
EP 3882952 A1 9/2021
WO WO-2023178056 A2 * 9/2023 ................ H01J 5/52

OTHER PUBLICATIONS

Feng Ling., International Search Report and Written Opinion, PCT/US2024/050855, Jan. 14, 2025, 11 pgs.

* cited by examiner

*Primary Examiner* — Abdulmajeed Aziz
*Assistant Examiner* — Nathaniel J Lee
(74) *Attorney, Agent, or Firm* — USCH Law, PC

(57) ABSTRACT

An excimer lamp comprises an enclosure having one or more windows, and electrodes distanced from the one or more windows such that UV light generated inside the enclosure in a region near the electrodes travels a predetermined minimum distance before exiting the enclosure. The excimer lamp further comprises a heat sink having one or more first surfaces facing an environment outside the enclosure and one or more second surfaces facing the electrodes or the region near the electrodes. The heat sink is configured to receive heat from the electrodes and/or the region near the electrodes through the second surfaces and to conduct the heat to the environment outside the enclosure through the first surfaces. The one or more first surfaces has an area that is at least twice an area of the one or more second surfaces.

20 Claims, 11 Drawing Sheets

EXCIMER LAMP WITH INTEGRATED HEATSINK

CROSS REFERENCE TO RELATED APPLICATIONS

This application is a non-provisional application of U.S. Provisional Application No. 63/589,309, filed Oct. 10, 2023, which is incorporated herein by reference in its entirety.

TECHNICAL FIELD

This application relates generally to decontamination lamps, and more particularly, to an excimer lamp with integrated heat sink.

BACKGROUND

Lamps irradiating ultraviolet light, e.g., 222 nanometer (nm) excimer lamps, have been widely used for air or surface treatment or decontamination. Existing 222 nm excimer lamps have several issues such as low lifespan, harmful by-products, safety, and high cost. As examples, FIGS. 1A and 1B illustrate conventional excimer lamps each using a metal rod or metal foil as an internal electrode. The external electrode is usually wire-mesh or spirally wound wires. In the excimer lamp shown in FIG. 1A or 1B, the hottest area is the electrode. In both cases, it is very difficult to remove heat from the electrodes due to lack of exposed area to dispense heat or effect to have heat transfer could result in UV light being blocked. As a further example, FIG. 2 illustrates a conventional excimer lamp using metal plates as electrodes. The electrode plates are very thin and have no heat dissipation.

Despite the promise of long lifespan, most 222 nm excimer lamps last about 1000-2000 hours, sometimes even less. An important reason for the poor than desired lifespan, is due to the reaction of the quartz bulb with the small amount chlorine in the working gas mixture contained therein at high temperature, creating solid chlorine siloxane film and exhaustion of chlorine in the working gas mixture. The rate of reaction rises exponentially with temperature. Therefore, proper thermal management is extremely critical. Current solution uses either forced-air or water cooling. But both water (0.6 W/mK) and air (~0.02 W/mK) have poor thermal conductivity.

The 222 nm UV light has very high photon energy, which is one of the reasons for its high germicidal efficacy. This high photon energy is also able to break down nitrogen and oxygen molecules in the air to generate a complex reaction chain of $N_xO_x$ and $O_x$ products. Among the byproducts, Ozone($O_3$) and $NO_2$ are well-known pollutants in the air. The second source of air pollutants is the micro-gaps between electrodes and quartz walls in commonly used designs where wire mesh, metal rods or spirally wound wires are used as electrodes. These micro-gaps form numerous regions of atmospheric plasma which in turn generate ozone and other byproducts. The third source of air pollutants is due to the fact that 222 nm excimer lamps are usually driven by the high voltage pulse or AC power supplies. The exposed printed circuit boards, wires and terminals can generate corona discharge. Some manufacturer(s) choose to fully enclose the 222 nm UV bulbs in an effort to reduce the release of by-products into the environment, but that comes with the problem of managing the temperature within the enclosure, which in turn limits the power input/output of the UV lamp.

Further, high voltage power sources used in excimer lamps require special design to minimize the risk of exposure to operators and users. Common conventional designs have exposed high voltage electrodes which require special enclosure(s) to conform to international safety standards.

High production cost is another major barrier that prevents the wide adoption of 222 nm UV despite of its known advantages over existing UV sources. Compared to 254 nm UV, the high cost of 222 nm UV comes from the following areas: (1) coaxial bulbs are labor-intensive to make; (2) large quantity of high-quality quartz glass is needed for each bulb; (3) expensive high voltage power supply is required; (4) additional safety measures are required due to exposed high voltage electrodes; and (5) forced air or water cooling are frequently required to extend the lifespan of the bub, but with added expense and complexity.

SUMMARY

For a better understanding of the various described embodiments, reference should be made to the Detailed Description below, in conjunction with the following drawings in which like reference numerals refer to corresponding parts throughout the Figures.

An excimer lamp of the present disclosure improves thermal management of the excimer lamp, leading to a more streamlined design that is user-friendly and extends the lifespan of the excimer lamp. Unlike conventional excimer lamps, the present disclosure describes an excimer lamp with an integrated heat sink to improve heat dissipation. Features of the excimer lamp with an integrated heat sink improve thermal management of the excimer lamp, leading to improved lifespan of the excimer lamp and allows for less heat transfer to a surface of the excimer lamp allowing users to comfortable handle the excimer lamp without the need for additional enclosures or protective wear (e.g., gloves).

In accordance with some implementations, an excimer lamp includes an enclosure having one or more windows that allow UV light to pass through, electrodes distanced from the one or more windows such that UV light generated in a region near the electrodes travels a predetermined minimum distance before exiting the enclosure, and a heat sink having one or more first surfaces facing an environment outside the enclosure and one or more second surfaces facing the electrodes or the region near the electrodes. The heat sink is configured to receive heat from the electrodes or the region near the electrodes through the second surfaces and to conduct the heat to the environment outside the enclosure through the first surfaces. The one or more first surfaces have an area that is at least twice an area of the one or more second surfaces.

In some embodiments, the one or more first surfaces has an area that is at least 5 times an area of the one or more second surfaces.

In some embodiments, the predetermined minimum distance is at least 2 cm.

In some embodiments, the one or more windows are covered with one or more materials transparent to UV light and the region near the electrodes is enclosed in a UV bulb, and wherein a distance between a surface of the UV bulb and the one or more windows is at least 2 cm.

In some embodiments, the UV bulb is constructed from a single quartz cylinder.

In some embodiments, the enclosure provides a fully enclosed space around the region near the electrodes except one or more holes or gaps in the enclosure that allow equalization of air pressure inside and outside the enclosure.

In some embodiments, the heat sink forms part of the enclosure and is attached to the material transparent to UV light, and wherein the one or more holes or gaps include gaps between the heat sink and the material transparent to UV light or between different parts of the heat sink.

In some embodiments, each of the one or more holes or gaps is greater than about 0.01 mm2 and less than about 1 mm2 in size.

In some embodiments, the UV bulb has reflective coating on one side to control directions of UV irradiation.

In some embodiments, the heat sink has surfaces coated with UV reflective material to provide specular or diffused reflection of the UV light generated in the regions near the electrodes.

In some embodiments, at least one of the electrodes includes a thin metal strip, metal block, a deposited conductive film or block made of graphite, carbon fiber and/or one or more other conductive materials that is pressed against a material of the heat sink.

In some embodiments, at least one of the electrodes includes a block of bronze or brass or graphite material having a first surface area facing the region near the electrodes and a second surface area in thermal contact with the heat sink, the first surface area being smaller than the second surface area.

In some embodiments, the electrodes include one or more materials selected from the group consisting of aluminum, copper, brass, bronze, and graphite/carbon fiber.

In some embodiments, the heat sink includes one or more materials selected from the group consisting of aluminum, copper, brass, bronze, and graphite/carbon fiber.

In some embodiments, the heat sink includes one or more materials selected from the group consisting of aluminum oxide (alumina) ceramic, boron nitride ceramic, aluminum nitride ceramic, silicon carbide, silicon nitride, beryllium oxide, yttria oxide, and thermally conductive epoxy.

In Some Embodiments, the Heat Sink Includes a Metal Heat Sink and a Thermally Conducting Insulating Buffer Between a Metal Electrode and the Metal Heat Sink.

In some embodiments, the heat sink is configured to provide a clearance distance and a creeping distance between the electrodes and an exterior surface of the enclosure, the clearance distance being a shortest direct distance from a high-voltage electrode of the excimer lamp to an exterior of the excimer lamp or an electrically conductive portion of the heat sink, the creeping distance being a shortest surface distance from the high-voltage electrode to the exterior of the excimer lamp or the electrically conductive portion of the heat sink, each of the clearance distance and the creeping distance being large enough to ensure high-voltage safety in accordance with an applicable standard.

In some embodiments, the heat sink includes a ceramic piece that is shaped and coated with a reflective material or film to control directions of the UV light exiting the lamp.

In some embodiments, the heat sink includes a ceramic piece and the electrodes are at least partially embedded in the ceramic piece.

In some embodiments, the heat sink includes a ceramic piece and at least one of the electrodes includes a metal film plated on a surface of the ceramic piece facing the region where UV light is generated.

In some embodiments, the region near the electrodes is enclosed in a UV bulb and at least one of the electrodes includes a metal film plated on a surface of the UV bulb.

In some embodiments, at least part of the enclosure is formed of a transparent material, and the heat sink and the electrodes are external to and disposed on one side of the enclosure.

In some embodiments, the electrodes are at least partially embedded in the heat sink.

In some embodiments, the excimer lamp further comprises a hollow region surrounded by the heat sink and in fluid communication with the environment outside the enclosure, wherein the second surfaces include one or more surfaces adjacent the hollow region.

In some embodiments, the hollow region extends along a longitudinal direction of the excimer lamp between a first end and a second end of the excimer lamp and has at least one opening at the first end and/or the second end that allows fluid communication between the hollow region and the environment outside the excimer lamp.

Thus, systems are disclosed for an excimer lamp with an integrated heat sink. Such systems may complement or replace conventional excimer lamps.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

DETAILED DESCRIPTION OF THE EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

As discussed above, some excimer lamps emit ultraviolet light with very high photon energy. The 222 nm ultraviolet (UV) lamp is such an example. The high energy photon breaks down oxygen and nitrogen molecules in the air creating ozone and NOx byproducts. This phenomenon is especially pronounced near the surfaces of the bulbs of a conventional excimer lamp where the UV intensity is the highest. At further distance from the bulb, the UV intensity decreases, and the generation of byproduct also decrease significantly. The micro-gap discharge between the electrodes and the quartz bulb is another source of air byproducts.

FIGS. 3-9 illustrate cross-sectional views of excimer lamps according to various embodiments. The excimer lamps described herein include an enclosure, electrodes, and a heat sink. The enclosure includes one or more windows that allow light (e.g., UV light) to pass through. The electrodes are distanced from the one or more windows such that light generated in a region near the electrodes travels a predetermined minimum distance before exiting the enclosure. The heat sink includes one or more first surfaces facing an environment outside the enclosure and one or more second surfaces facing the electrodes or the region near the electrodes. The heat sink is configured to receive heat from the electrodes or the region near the electrodes through the second surfaces and to conduct the heat to the environment outside the enclosure through the first surfaces. The one or more first surfaces having an area (e.g., surface area) that is at least twice an area (e.g., surface area) of the one or more second surfaces. In some embodiments, the excimer lamp also includes a bulb (e.g., a UV bulb that outputs light within the UV range of the electromagnetic spectrum).

Figure 1A:
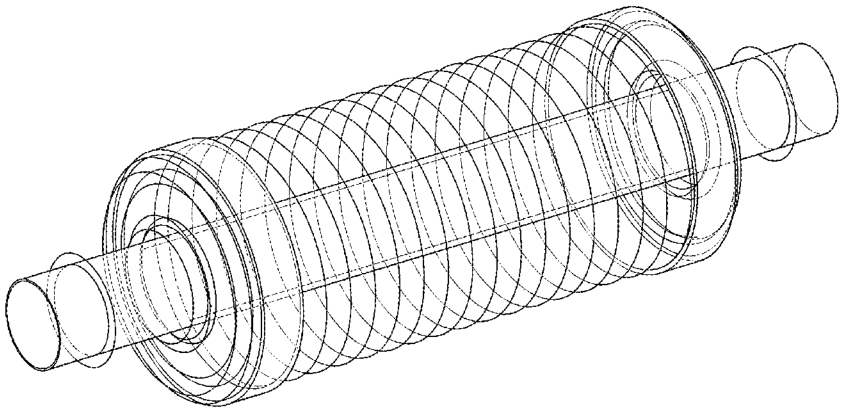
FIG. 1A (Prior Art)
FIGS. 1A and 1B illustrate conventional excimer lamps each using a metal rod or metal foil as an internal electrode.
Figure 1B:
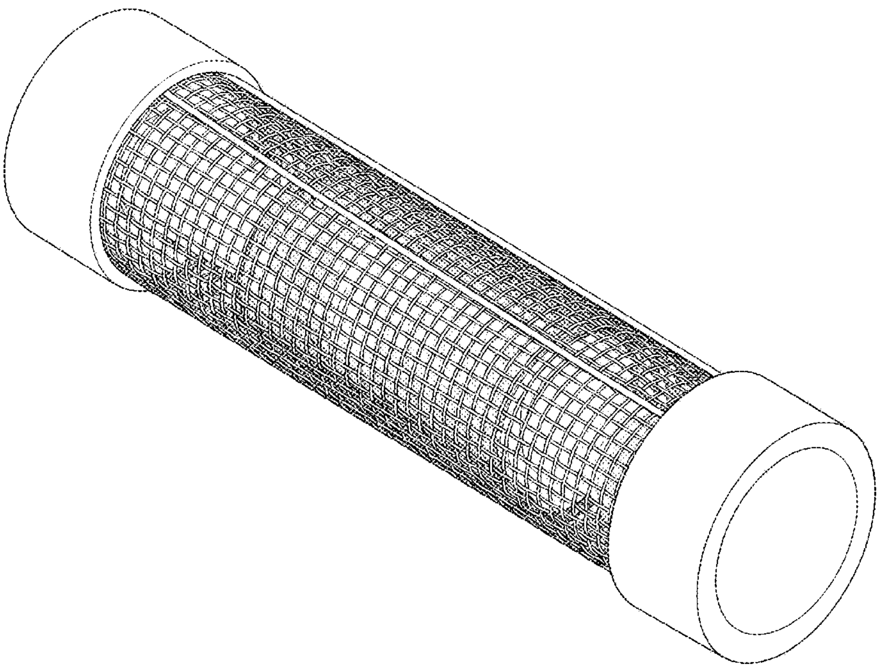
FIG. 1B (Prior Art)
Figure 2:
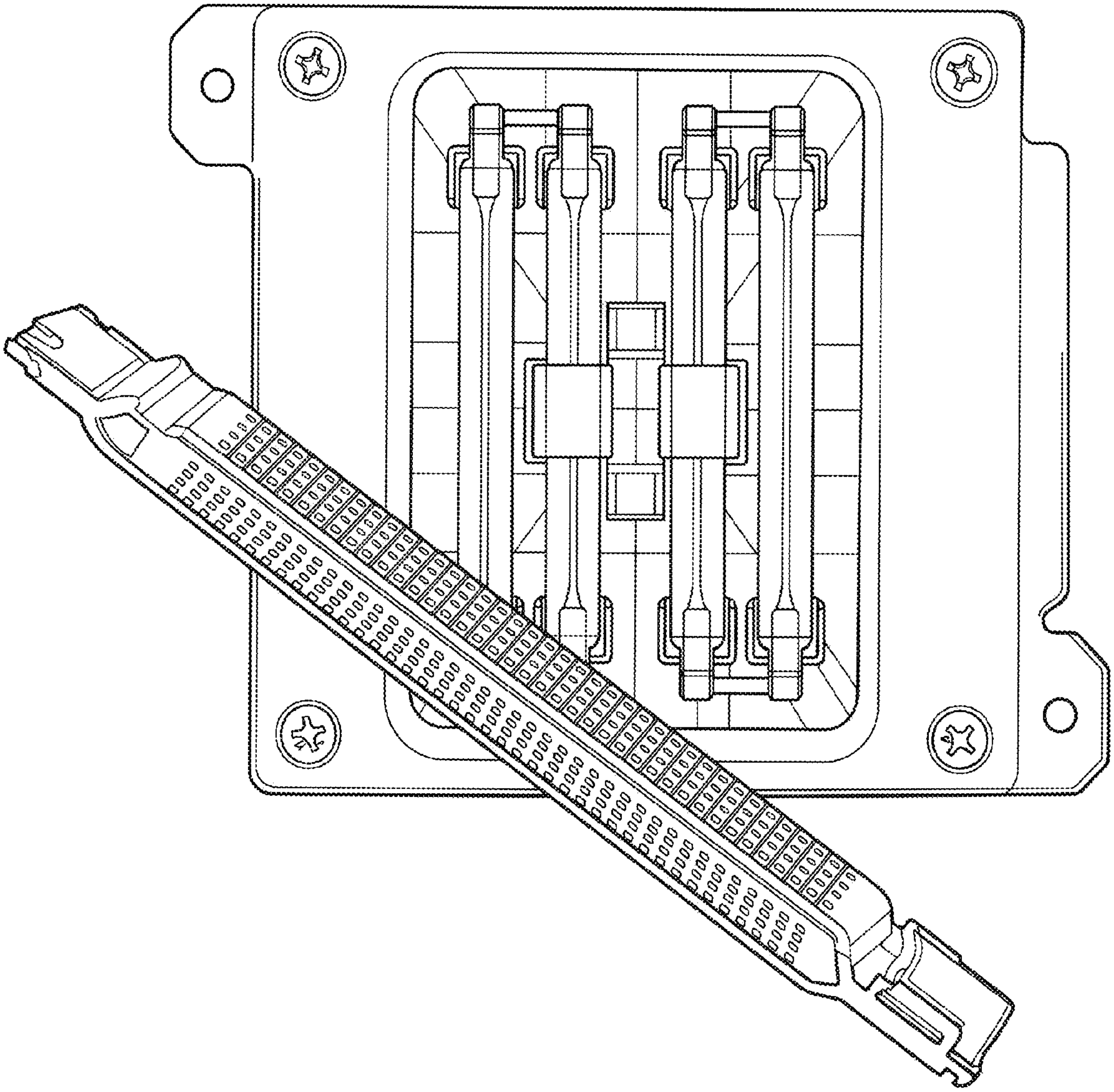
FIG. 2 (Prior Art)
FIG. 2 illustrates a conventional excimer lamp using metal plates as electrodes.
Figure 3:
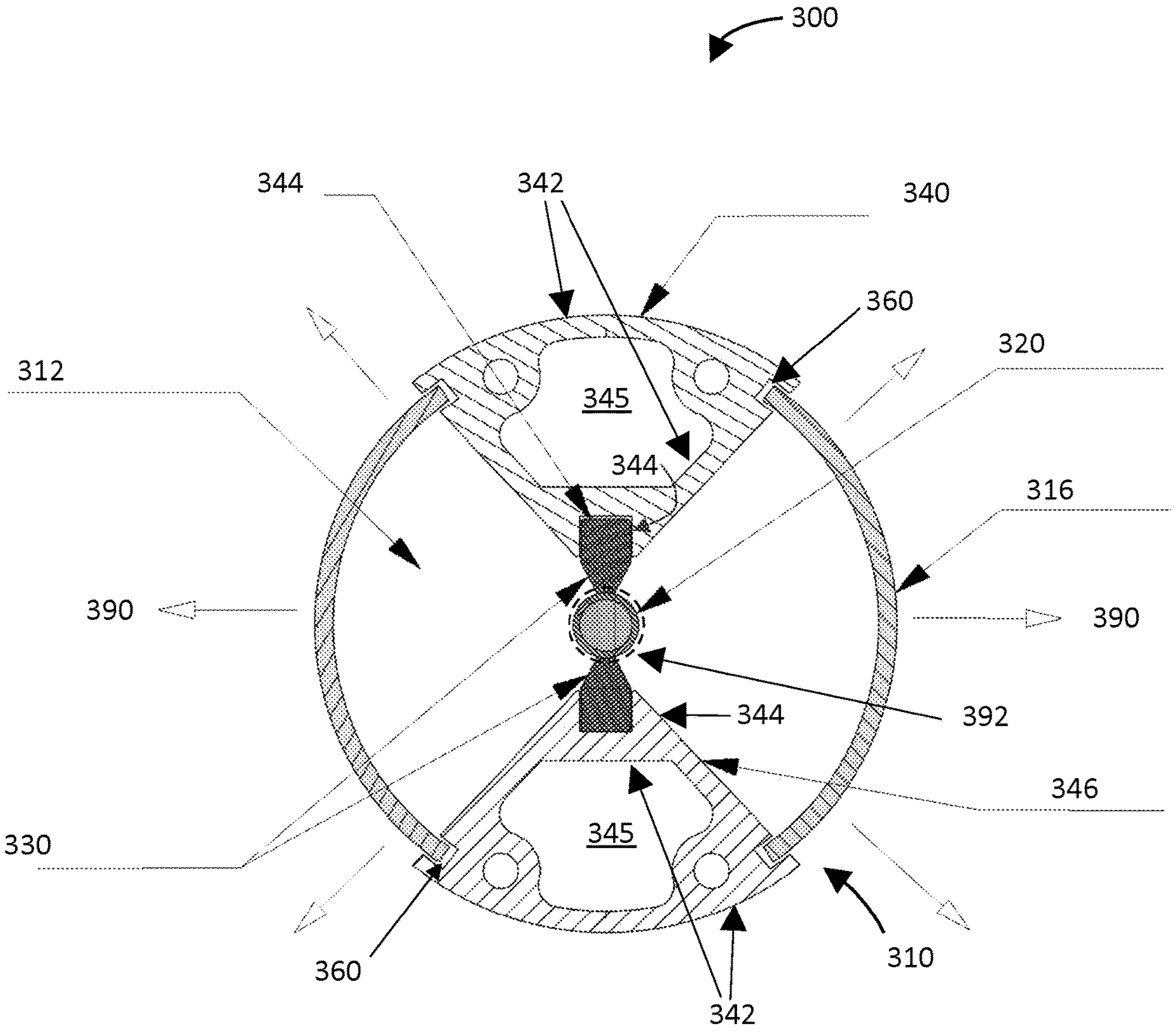
FIGS. 3-9 illustrate cross-sectional views of excimer lamps according to various embodiments.

FIG. 3 illustrates an excimer lamp 300 in accordance with some embodiments. The excimer lamp 300 includes an enclosure 310, a bulb 320 (e.g., a UV bulb that generate and outputs light within the UV range of the electromagnetic spectrum, such as a UV bulb that outputs light at 222 nm), and electrodes 330. The bulb 320 is positioned such that the bulb 320 encloses one or more regions 392 near (e.g., between) the electrodes 330, where UV light 390 is generated. For example, as shown in FIG. 3, the bulb 320 is positioned between two electrodes 330 so that in response to a voltage applied across the two electrodes 330, gas inside the bulb 320 is excited to generate (e.g., produce, output, emit) UV light 390. In some embodiments, the electrodes 330 are high voltage electrodes that are configured to apply high voltages (e.g., 5,000V or higher, 5,000-15,000V) across the region 392.

The enclosure 310 provides an enclosed region or space 312 (e.g., fully enclosed, semi-enclosed, mostly enclosed region or space) around the bulb 320. The enclosure 310 includes one or more windows 316. The one or more windows 316 allow UV light 390 to pass through (e.g., be transmitted from an interior of the enclosure to an environment outside the enclosure). In some embodiments, the one or more windows 316 include one or more glass covers (e.g., covers made mainly of glass material(s)). In some embodiments, the one or more windows 316 further include a selective wavelength filter or film formed on one or more surfaces of the one or more glass covers. For example, the one or more windows 316 may include one or more layers that is composed to material(s) having wavelength selective filtering capabilities (e.g., a UV selective filter). In some embodiments, the distance between the surface of the bulb 320 and a portion (e.g., any portion) of the one or more windows 316 is not less than a predetermined minimum distance to limit the amount of byproducts being generated by UV irradiation in the environment outside of the enclosure 310. In some embodiments, depending on the intensity of UV light generated by the UV bulb, the minimum distance is 2 centimeters (cm) or longer. In some embodiments, the minimum distance is 3 cm.

Excimer lamp 300 also includes one or more heat sinks 340, which also form part of the enclosure 310. The one or more heat sinks 340 allow heat (e.g., heat generated in or near the bulb 320 or heat generated in or near the electrodes 330) to be dissipated. In some embodiments, the one or more heat sinks 340 blocks some of the UV light 390 emitted from the bulb 320 in certain directions from exiting the enclosure. The one or more heat sinks include one or more first surfaces 342 that face the environment outside the enclosure 310 and one or more second surfaces 344 each facing an electrode 330 or the region 392 near the electrodes 330. The one or more heat sink may also include one or more third surfaces 346 facing an interior of the enclosure 310. The one or more third surfaces 346 may be coated with one or more materials to enhance reflection of the UV light incident thereupon. The one or more heat sinks 340 are configured to receive heat from the electrodes 330 or the region 392 near the electrodes through the second surfaces 344 and to conduct the heat to the environment outside the enclosure 310 through the first surfaces 342. In some embodiments, since heat conducts more efficiently from the electrodes to the heat sink(s) than heat conducts from the heat sink to the external environment, the one or more first surfaces 342 have an area (e.g., surface area) that is at least twice an area (e.g., surface area) of the one or more second surfaces 344. In some embodiments, the area of the one or more first surfaces 342 is at least five-times the area of the one or more second surfaces 344. In some embodiments, the area of the one or more first surfaces 342 is at least ten-times the area of the one or more second surfaces 344. In some embodiments, as shown in FIG. 3, the one or more second surfaces 344 wrap around multiple sides of the electrodes to provide larger contact areas to receive the heat from the electrodes.

As shown in FIG. 3, in some embodiments, the one or more heat sinks 340 includes a ceramic material that has high thermal conductivity and is a good electrical insulator. In some embodiments, the ceramic material in the heat sink is designed to optimize heat transfer capability, heat exchange with the environment outside the enclosure, insulation between electrode and any part of the lamp assembly that should not be exposed to high voltage, while maintaining low costs and case of manufacturing/assembly. For example, the one or more heat sinks 340 may be composed of (e.g., include) $AlO_3$ due to its cost effectiveness and ability to conduct heat well. In some embodiments, as shown in FIG. 3, the ceramic heat sink 340 is integrated or closely coupled with the electrodes 330. For example, each electrode 330 is partially embedded in the heat sink in a way that an surface area of the electrode 330 in thermal contact with (e.g., pressed against) the heat sink 340 is larger than a surface area of the electrode 330 facing the region 392.

Figure 10:
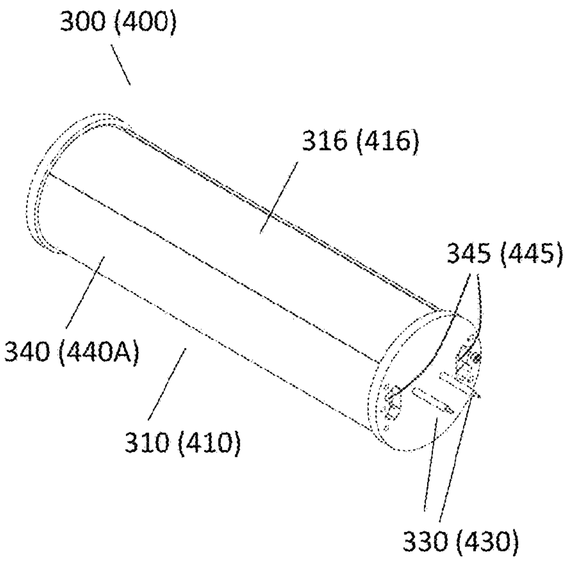
FIGS. 10-15 illustrate perspective views of excimer lamps according to various embodiments.

In some embodiments, the excimer lamp 300 also includes one or more hollow regions 345 each being surrounded by at least one of the one or more heat sinks. The hollowed region 345 is open at one or both ends thereof, as shown in FIG. 10, which is a perspective view of the excimer lamp 300, and is thus in fluid communication with the external environment. This way, the surface of the heat sink facing and surrounding the hollow region 345 is also part of the first surfaces 342. Therefore, the hollow region(s) 345 function to increase the area of the first surfaces 342, and may also help to reduce the weight and improve the strength and durability of the excimer lamp, and to save material costs.

As shown in FIG. 3, in some embodiments, the excimer lamp 300 includes one or more small gaps 360 between the one or more windows 316 and the one or more heat sinks 340. In some embodiments, some of the gaps 360 between the one or more windows 316 and the one or more heat sinks 340 are filled with a high conductivity thermal paste (e.g., glue, silicone gel) so that the enclosed space 312 is almost airtight although not 100% airtight due to some of the gaps being left unfilled to act as vent holes. Each of the vent holes or gaps 360 is small enough to prevent gas leak but big enough to allow expansion of parts due to temperature changes and to allow balance of pressure inside and outside the enclosure. In some embodiments, the size of each vent hole or gap 360 can be, for example, about 0.01 $mm^2$ to about 1 $mm^2$. The one or more vent holes or gaps 360 can also include micro-gaps between ceramic components of the excimer lamp 300 (e.g., micro-gaps may be present as part of the one or more heat sinks 340 that is composed of ceramic).

As shown in FIG. 3, in some embodiments, the excimer lamp 300 has a relatively circular cross-section with each of the one or more heat sinks 340 forming two opposite portions of the circumference of the circle and each of the one or more windows 316 forming the two other opposite portions of the circumference of the circle, so that each of the one or more heat sinks 340 is disposed adjacent to and between each of the one or more windows 316.

Figure 4:
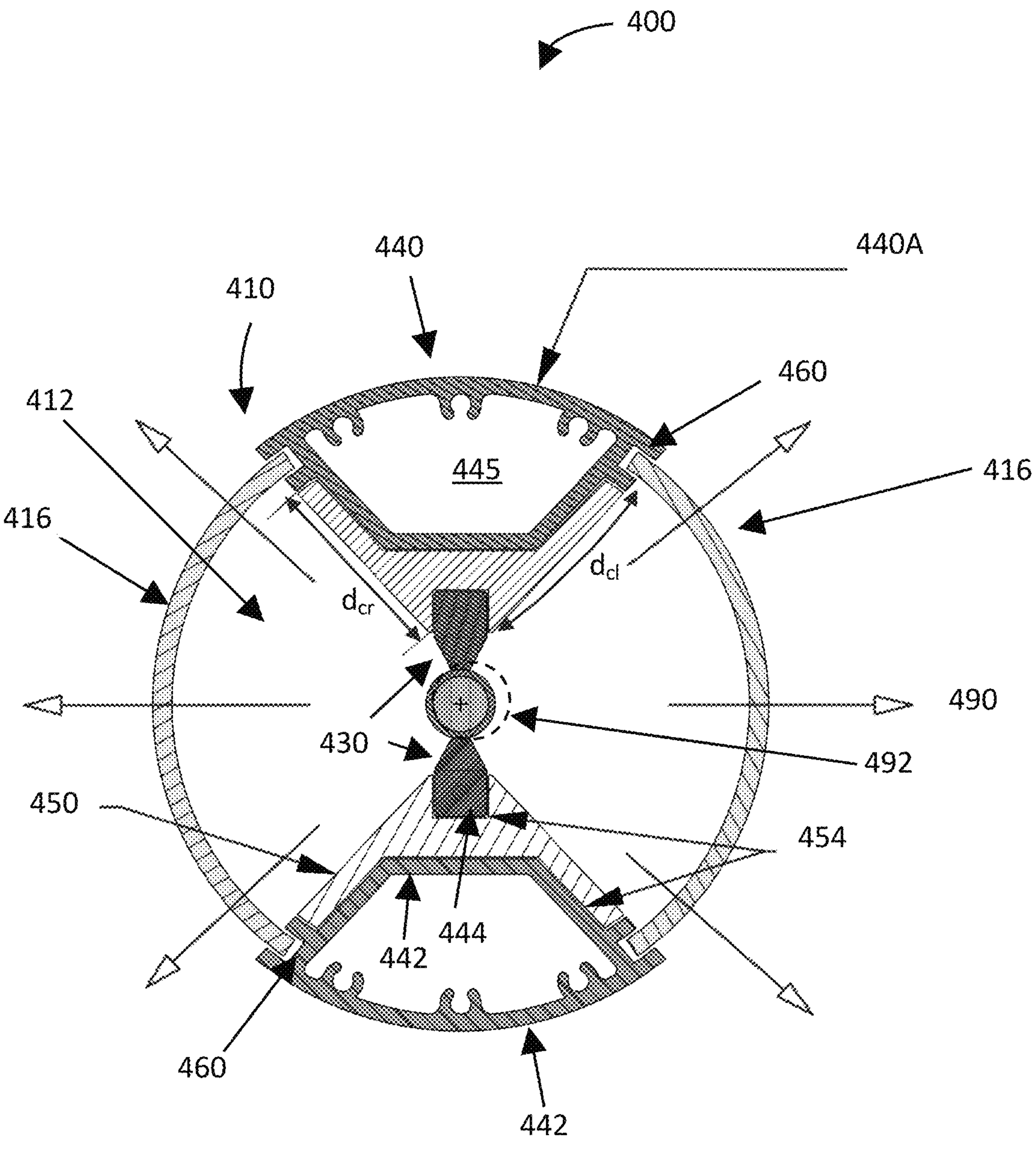

FIG. 4 illustrates an excimer lamp 400 in accordance with some embodiments. The excimer lamp 400 includes an enclosure 410, a bulb 420, electrodes 430, one or more heat sinks 440, and one or more windows 416. The one or more heat sinks 440 allow heat (e.g., heat generated at the bulb 420 or heat generated in the one or more regions 492 near the electrodes 430) to be dissipated. In some embodiments, the one or more heat sinks 440 blocks some of the UV light 490 emitted from the bulb 420 in certain directions from exiting the enclosure 410. Like the heat sinks 340 shown in FIG. 3, one or more heat sinks 440 include one or more first surfaces 442 that faces an environment outside the enclosure 410 and one or more second surfaces 444 facing the electrodes 430 or the region 492 near the electrodes 430. The one or more heat sinks 440 is configured to receive heat from the electrodes 430 or the region 492 near the electrodes through the second surfaces 444 and to conduct the heat to the environment outside the enclosure 410 through the first surfaces 442. In some embodiments, the one or more first surfaces 442 have an area (e.g., surface area) that is at least twice an area (e.g., surface area) of the one or more second surfaces 444.

As shown in FIG. 4, in some embodiments, each heat sink of the one or more heat sinks 440 includes a respective external metal heat sink 440A made of a metal or metal alloy (e.g., aluminum,) and a respective electrically insulating buffer 450 made of, for example, a ceramic material having good thermal conductivity (e.g., $AlO_3$). The metal heat sink 440A provides improved thermal conductivity and thus improved efficiency in heat dissipation. In some embodiments, the excimer lamp 400 also includes one or more hollow regions 445 each being surrounded by at least one of the one or more heat sinks 440A. The hollowed region 445 extends along a longitudinal direction of the excimer lamp 300 and is open at one or both ends of the excimer lamp 300, as shown in FIG. 10, which is a perspective view of the excimer lamp 400, and is thus in fluid communication with the external environment, to provide a large area for heat to be dissipated through the first surfaces 442 to the external environment, as discussed above with respect to FIG. 3. A respective buffer 450 (e.g., a respective thermally conducting and electrically insulating buffer 450) is disposed between a respective electrode 430 and a respective metal heat sink 440A. The buffer 450 provides the one or more second surfaces 444 (of the one or more heat sinks 440) via which the heat sink 440 receives heat from the electrodes 430. In some embodiments, the buffer 450 is composed of (e.g., includes) a ceramic material or any other electrically insulating and thermally conducting material. This configuration allows the external metallic heat sink(s) 440A to be grounded (e.g., electrically connected to a ground voltage source), thereby reducing electro-magnetic interference generated by the excimer lamp 400.

As shown in FIG. 4, in some embodiments, the buffer 450 alone, or together with the metal heat sink 440B provide two critical functions: (1) protect the bulb 420 and the electrodes 430, and (2) form an almost-air-tight barrier with the one or more windows 416 to prevent ozone and nitrogen oxides from exiting the excimer lamp and entering the outside environment.

As shown in FIG. 4, in some embodiments, the excimer lamp 400 includes one or more small gaps 460 between the one or more windows 416 and the one or more heat sinks 440 or the buffer 450. In some embodiments, the one or more vent holes or gaps 460 can also include micro-gaps between ceramic components of the excimer lamp 400 (e.g., micro-gaps may be present as part of the buffer 450 that is composed of ceramic). Additional details regarding the gaps 460 are similar to what is provided above with respect to the gaps 360 shown in FIG. 3 and are not repeated here for brevity.

FIG. 4 illustrates a clearance distance $d_{cr}$ and a creeping distance $d_{cr}$. In some embodiments, the one or more heat sinks 440 is designed such that both a clearance distance $d_{cl}$ and a creepage distance $d_{cr}$ are large enough to ensure high-voltage safety, as governed by applicable international standards (e.g., the IEC TS 62993, IEC 60664-1, IEC 60601, ICE 60950-1, or IPC-2221 Standard). The clearance distance $d_{cl}$ is the in the "line of sight" distance or the shortest air path (e.g., path of travel through air) between two conductors, or the shortest distance that can achieve insulation through the air from the high-voltage electrode (e.g., a shortest direct distance from a high-voltage electrode 430 of the excimer lamp 400 to an exterior of the excimer lamp 400 or an electrically conductive portion of the one or more heat sinks 440). The creepage distance $d_{cr}$ is the shortest distance between two conductors along an insulating surface (e.g., a shortest surface distance from the high-voltage electrode 430 to the electrically conductive portion 440A of the one or more heat sinks 440). In some embodiments, as shown in FIG. 4, extended ceramic portions are provided to increase the creepage distance $d_{cr}$ (e.g., increase the distance along a surface of the buffer 450 between the high-voltage electrode 430 to the metal portion 440A of the one or more heat sinks 440). Each of the clearance distance and the creeping distance are large enough to ensure high-voltage safety in accordance with an applicable standard. In some embodiments, a material with high electrical insulation property is used as either an insulation layer or as part of the enclosure 410 itself. The insulation layer or enclosure 410 is designed such that it must satisfy international standard on high voltage safety, including creepage and clearance considerations.

As shown in FIG. 4, in some embodiments, the excimer lamp 400 has a relatively circular cross-section with each of the one or more heat sinks 440 (including metal portion(s) 440A and buffer portion(s) 450) forming opposite arcs of the circle and each of the one or more windows 416 forming the remaining opposite arcs of the circle so that each of the one or more heat sinks 440 is disposed adjacent to and between each of the one or more windows 416.

Configuration and composition of the enclosure 410, the bulb 420, electrodes 430, and one or more windows 416 can be similar to the enclosure 310, the bulb 320, the electrodes 330, and the one or more windows 316 (respectively), which are provided above with respect to FIG. 3 and are not repeated here for brevity.

Figure 5:
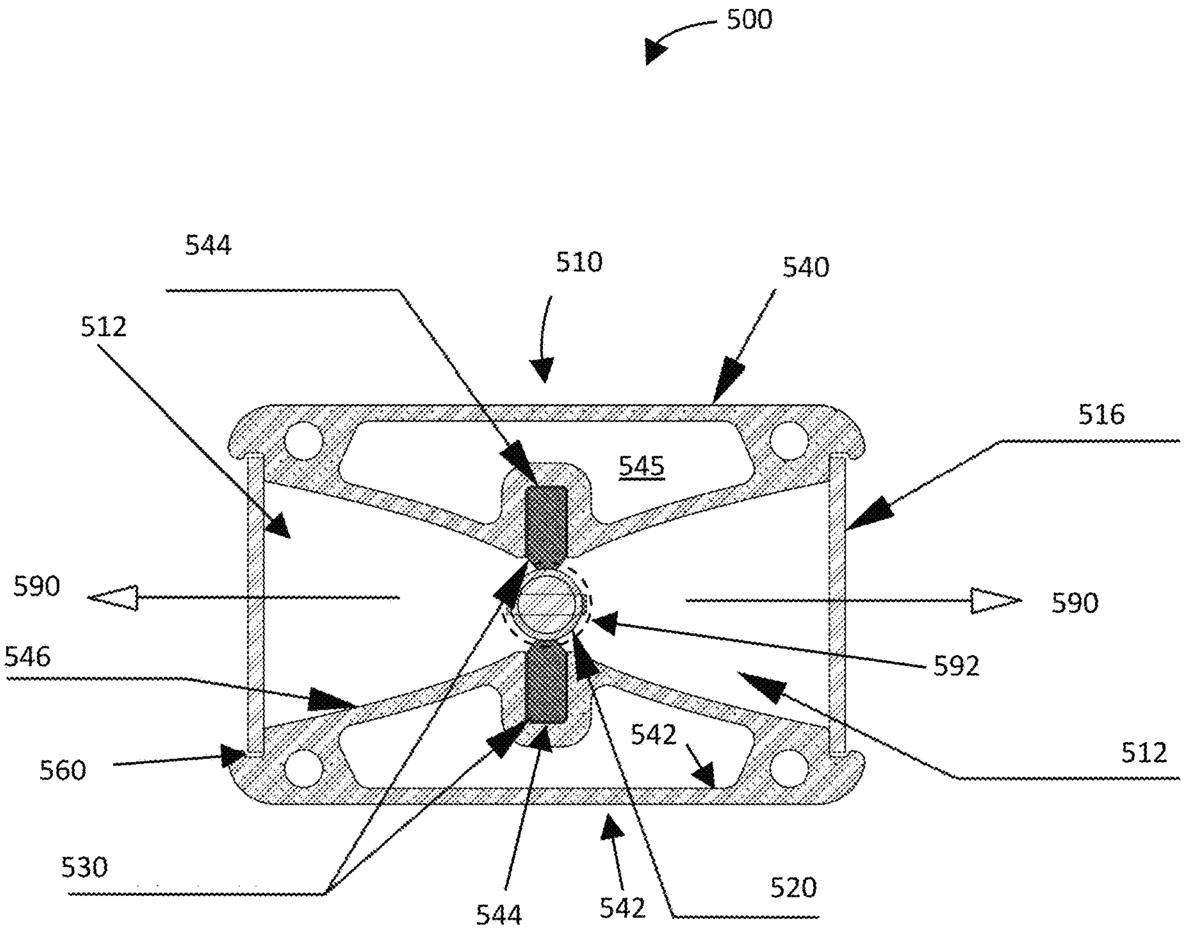

FIG. 5 illustrates an excimer lamp 500 in accordance with some embodiments. The excimer lamp 500 includes an enclosure 510, a bulb 520, electrodes 530, one or more heat sinks 540, one or more windows 516, and optionally, one or more small gaps 560 between the one or more windows 516 and the one or more heat sinks 540. The one or more heat sinks 540 forms part of the enclosure 510. The one or more heat sinks include one or more first surfaces 542 that faces an environment outside the enclosure 510 and one or more second surfaces 544 facing the electrodes 530 or the region 592 near the electrodes 530. As shown in FIG. 5, compared with the excimer lamps 300 and 400 discussed above with respect to FIGS. 3 and 4, which each has a mostly circular cross-section, the excimer lamp 500 has a mostly rectangular cross-section, with each of the one or more windows 516 forming two opposite sides of the rectangle and each of the one or more heat sinks 540 forming the other two opposite sides of the rectangle. As shown in FIG. 5, in some embodiments, each of the one or more heat sinks 540 is disposed adjacent to and between each of the one or more windows 516. In some embodiments, one or more of the one or more windows 516 may be blocked or non-transmissive to provide the UV light 590 in a specific direction.

In some embodiments, the one or more heat sinks 540 includes a parabolic surface 546 (e.g., a parabolic reflective surface having a parabola-shaped cross-section). The parabolic surface includes a reflective coating or is coated with a reflective material that redirects the UV light 590 emitted from the bulb 520 and incident upon the parabolic surface toward the window on the side of the parabolic surface. In some embodiments, the light bulb is located close to a focal axis of the parabolic surface. As a result, light emitted from the excimer lamp 500 can be more directional, e.g., mostly in a direction perpendicular to the window 590 through which the light exits the lamp, as shown in FIG. 5. towards the one or more windows 516. In some embodiments, the one or more heat sinks 540 includes a ceramic material that has high thermal conductivity and is a good electrical insulator, and the ceramic material in the one or more heat sinks 540 is wrapped around the electrodes 530 so that the electrodes 530 are at least partially embedded within the ceramic heat sink(s) 540. In some embodiments, at least one of the heat sinks 540 surrounds a hollow region 545, which is in fluid communication with the external environment, to provide a large area for heat to be dissipated through the first surfaces 542 to the external environment, as discussed above with respect to FIG. 3.

In some embodiments, the enclosure 510 includes one or more surfaces (such as reflective surfaces) that act as reflectors of UV light 590 to increase overall efficiency of the excimer lamp 500. These surfaces (e.g., reflective surfaces) may be coated with a UV reflective material that provides high specular or diffused reflection at the wavelength of interest (e.g., the wavelength of the UV light 590 emitted from the bulb 520). The reflective material should normally have good electrical insulation properties unless the geometry of the device allows the usage of conductive reflectors without compromising safety. For example, parabolic surface 546 may be a reflective surface that is coated with a UV reflective material. In some embodiments, the excimer lamp 500 is used for upper room disinfection and thus, must meet international standards on UV exposure limits for people in the room. Thus, the one or more heat sinks 540 and/or the buffer 550, when composed of ceramic, is coated with a reflective material or film to control the direction of the UV light 590 exiting the excimer lamp 500.

Additional aspects of the enclosure 510, the bulb 520, the electrodes 530, the one or more windows 516, the one or more heat sinks 540, the one or more first surfaces 542, the one or more second surfaces 544, and the gaps 560 can be similar to the enclosure 310, the bulb 320, the electrodes 330, the one or more windows 316, the one or more heat sinks 340, the one or more first surfaces 342, the one or more second surfaces 344, and the gaps 360 (respectively) shown in FIG. 3 and are not repeated here for brevity.

Figure 6:
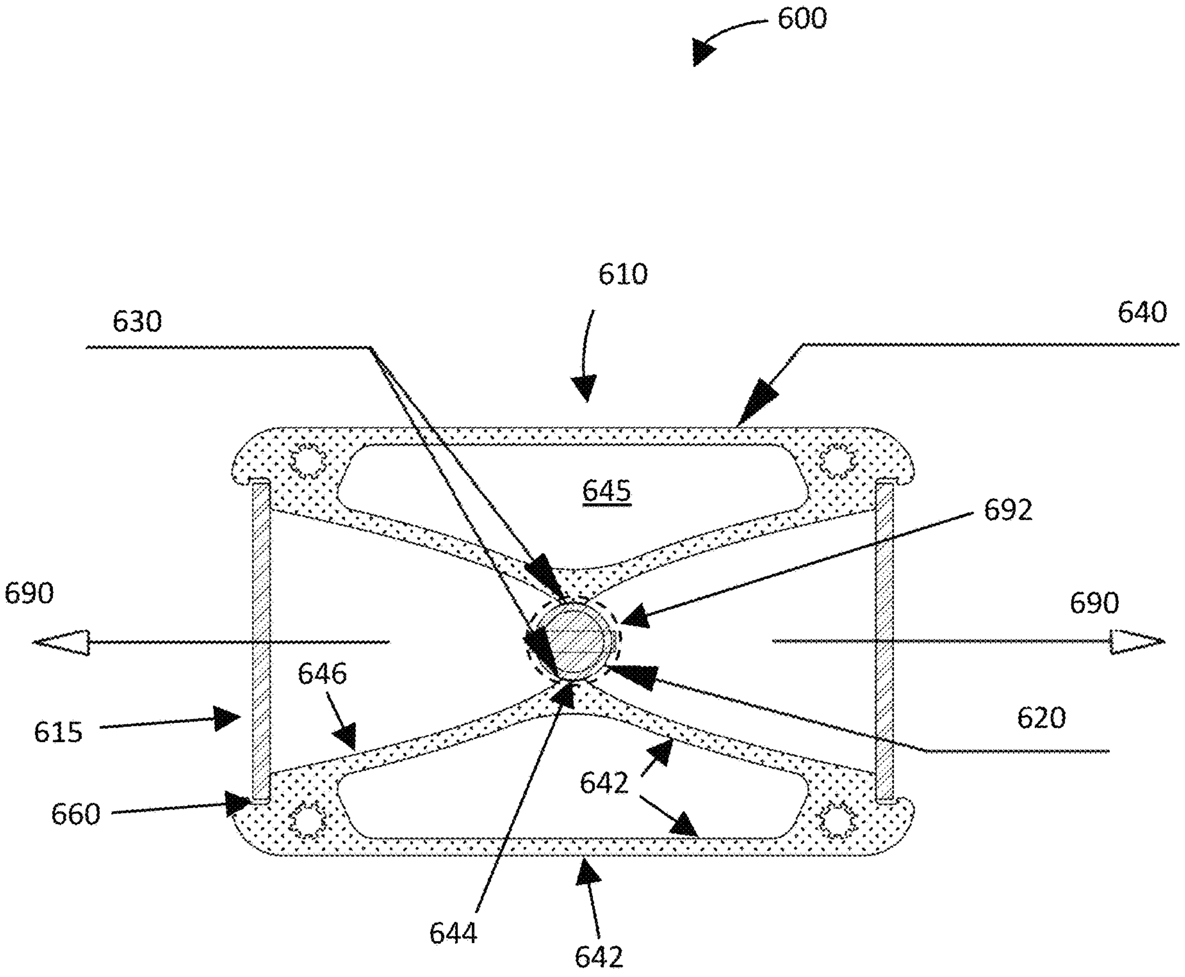

FIG. 6 illustrates an excimer lamp 600 in accordance with some embodiments. The excimer lamp 600 includes an enclosure 610, a bulb 620, electrodes 630, one or more heat sinks 640, one or more windows 616, and optionally, one or more small gaps 660 between the one or more windows 616 and the one or more heat sinks 640.

As shown in FIG. 6, compared with the electrodes 330, 430, and 530 shown in FIGS. 3-5, the one or more electrode 630 includes a metal (e.g., copper) film on a surface of the ceramic heat sink(s) 640 that faces the region where UV light 690 is generated. The thickness of the metal film (e.g., the electrodes 630) can be in the range of 0.005-5 millimeters (mm) or 0.02-3 mm.

The one or more heat sinks 640 also include one or more first surfaces 642 that face an environment outside the enclosure 610 and one or more second surfaces 644 facing the electrodes 630 or the region 692 near the electrodes 630. In some embodiments, the enclosure 610 includes one or more surfaces 646 with reflective coating that enhances reflection of UV light 690 to increase overall efficiency of the excimer lamp 600. In some embodiments, the one or more surfaces 646 have a parabolic shape. In some embodiments, the excimer lamp 600 can be controlled or designed to emit light in a specific direction (e.g., not omnidirectional emission). This can be achieved using parabola shaped surfaces with a focal axis at or near a center axis of the bulb 630.

Other aspects of the one or more first surfaces 642, and the one or more second surfaces 644, and the one or more surfaces 646 can be similar to the one or more first surfaces 542, the one or more second surfaces 544, and the one or more parabolic surfaces 546 (respectively) shown in FIG. 5 and are not repeated here for brevity.

As shown in FIG. 6, like the excimer lamp 500, the excimer lamp 600 has a mostly rectangular cross-section, with each of the one or more windows 616 forming two opposite sides of the rectangle and each of the one or more heat sinks 640 forming the other two opposite sides of the rectangle. As shown in FIG. 6, in some embodiments, each of the one or more heat sinks 640 is disposed adjacent to and between each of the one or more windows 616. In some embodiments, one or more of the one or more windows 616 may be blocked or non-transmissive to UV light to provide the UV light 690 in a specific direction. In some embodiments, at least one of the heat sinks 640 surrounds a hollow region 645, which is in fluid communication with the external environment, to provide a large area for heat to be dissipated through the first surfaces 642 to the external environment, as discussed above with respect to FIG. 3.

Other aspects of the enclosure 610, the bulb 620, the electrodes 630, the one or more windows 616, the one or more heat sinks 640, and the gaps 660 can be similar to the enclosure 310, the bulb 320, the electrodes 330, the one or more windows 316, the one or more heat sinks 340, and the gaps 360 (respectively) shown in FIG. 3 and are not repeated here for brevity.

Figure 7:
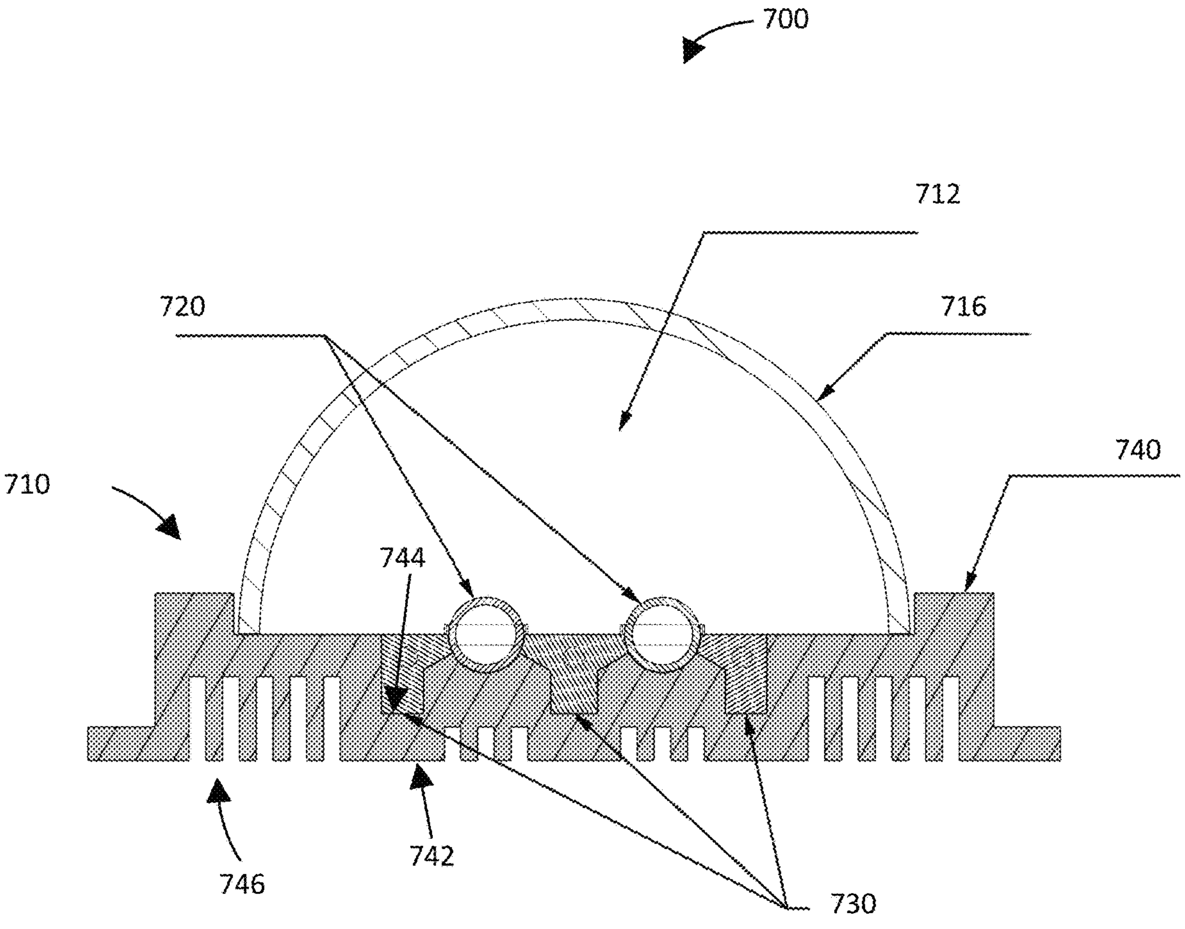

FIG. 7 illustrates an excimer lamp 700 in accordance with some embodiments. The excimer lamp 700 includes an enclosure 710, one or more bulbs 720, electrodes 730, a heat sink 740, a window 716, and optionally, one or more small gaps between the one or more windows 716 and the heat sink 740.

As shown in FIG. 7, in some embodiments, each bulb of the one or more bulbs 720 is positioned between two electrodes 730 of opposite polarities so that in response to a voltage applied across the electrodes 730, gas inside the one or more bulbs 720 is excited to generate (e.g., produce, output, emit) UV light 790. For example, among the three electrodes 730 shown in FIG. 7, high voltage can be applied to the electrode in the middle while the other two electrodes are grounded, or vice versa.

The one or more heat sinks 740 include one or more first surfaces 742 that faces an environment outside the enclosure 710 and one or more second surfaces 744 facing the electrodes 730 or the region 792 near the electrodes 730. In some embodiments, the ratio of the area (e.g., surface area) of the one or more first surfaces 742 to the area (e.g., surface area) of the one or more second surfaces 744 can be achieved by taking advantage of the smaller size of the bulb(s) 720 and/or the electrodes 730 compared to the outer dimensions of enclosure 710 of the excimer lamp 700. In the embodiments, each of the bulb(s) 720 and each of the electrodes is closely coupled with the one or more heat sinks 740. In some embodiments, the area (e.g., surface area) of the one or more first surfaces 742 can be increased to achieve the aforementioned ratio by having features 746 such as fins or trenches or bumps or the like. Such features can also be implemented for any of the heat sinks described herein (e.g., heat sink(s) 340, 440, 540, 640, 840, 940 shown in FIGS. 3, 4, 5, 6, 8, and 9, respectively).

As shown in FIG. 7, compared with the excimer lamps (e.g., excimer lamps 300, 400, 500 and 600) discussed above with respect to FIGS. 3-6, the excimer lamp 700 has a mostly semi-circular cross-section, with the window 716 forming the curved (e.g., arc) portion of the semi-circle and the heat sink 740 forming the substantially planar (e.g., flat, straight, non-curved) portion of the semi-circle.

Other aspects of the enclosure 710, the one or more bulbs 720, the electrodes 730, the window 716, the heat sink 740, and the optional gaps can be similar to the enclosure 310, the bulb 320, the electrodes 330, the one or more windows 316, the one or more heat sinks 340, and the gaps 360 (respectively) shown in FIG. 3 and are not repeated here for brevity.

Figure 8:
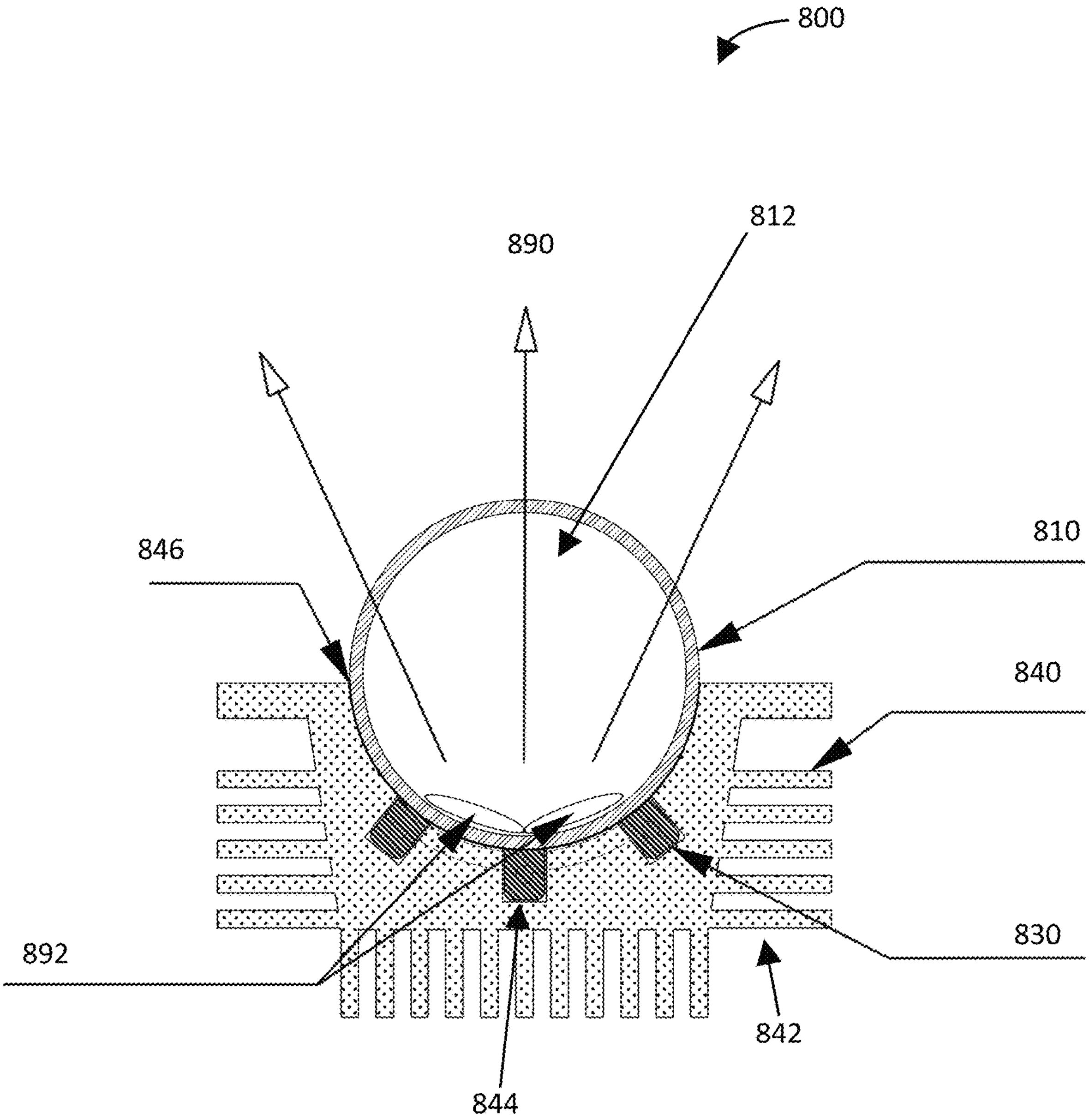

FIG. 8 illustrates an excimer lamp 800 in accordance with some embodiments. The excimer lamp 800 includes an enclosure 810, electrodes 830, and a heat sink 840 that is disposed (e.g., located, positioned) on one side of the bulb 810 and is external to the bulb 810. In some embodiments, the enclosure 810 also acts as a bulb and the electrodes 830 are placed outside of, and on one side of, the enclosure 810. Thus, UV light is generated is generated inside the bulb 810, in one or more region s892 near the electrodes 830. The heat sink 840 is wraps around multiple sides of each electrode 830 and includes one or more first surfaces 842 that faces an environment outside the enclosure 810 and one or more second surfaces 844 facing the electrodes 830 and/or the region(s) 392 near the electrodes 830.

As shown in FIG. 8, in some embodiments, the enclosure 810, which also acts as a bulb, is positioned adjacent to the electrodes 830 so that in response to a voltage applied across the electrodes 830, gas inside the bulb 810 in a region 892 near and between every two electrodes 830 of opposite polarities is excited to generate (e.g., produce, output, emit) UV light 890.

As shown in FIG. 8, in some embodiments, the electrodes 830 are external to the enclosure or bulb 810 and at least partially embedded in the heat sink 840, on the side of the heat sink 840 that faces the bulb 810. UV light 890 is generated in one or more regions 892 inside of the bulb 810 near the electrodes 830 and the heat sink 840 such that the heat sink 840 acts to: (1) dissipate heat from the electrodes 830, and (2) block the UV light 890 from exiting the bulb 810 on the side of the bulb 810 near the electrodes 830 so that the UV light 890 generated near the electrodes 830 has to travel the minimum predetermined distance within the bulb 810 before exiting the bulb 810. In some embodiments, the minimum predetermined distance is 2 cm. In some embodiments, such as when the UV light 890 has a wavelength that is longer than 253 nm, the 2 cm distance requirement is not required since the photon energy is not high enough to create significant harmful byproducts in the air. Thus, in some embodiments, the minimum predetermined distance is larger than 2 cm, as specified above with reference to FIG. 3.

In some embodiments, the excimer lamp 800 includes one or more surfaces 846 (such as reflective surfaces) inside or outside the bulb 810 on the side of the bulb 810 adjacent the heat sink 840. The reflective surface(s) 846 act as reflectors of UV light 890 to increase overall efficiency of the excimer lamp 800. These surfaces (e.g., reflective surfaces) may be coated with a UV reflective material that provides high specular or diffused reflection at the wavelength of interest (e.g., the wavelength of the UV light 890 emitted from the bulb 810). The reflective material should normally have good electrical insulation properties unless the geometry of the device allows the usage of conductive reflectors without compromising safety. For example, the heat sink 840 may include the surface 846 that is reflective (e.g., coated with a UV reflective material or includes a UV reflective material).

Additional aspects of the enclosure 810, the electrodes 830, and the heat sink 840 can be similar to the enclosure 710, the electrodes 730, and the one or more heat sinks 740 (respectively) shown in FIG. 7 and are not repeated here for brevity.

Figure 9:
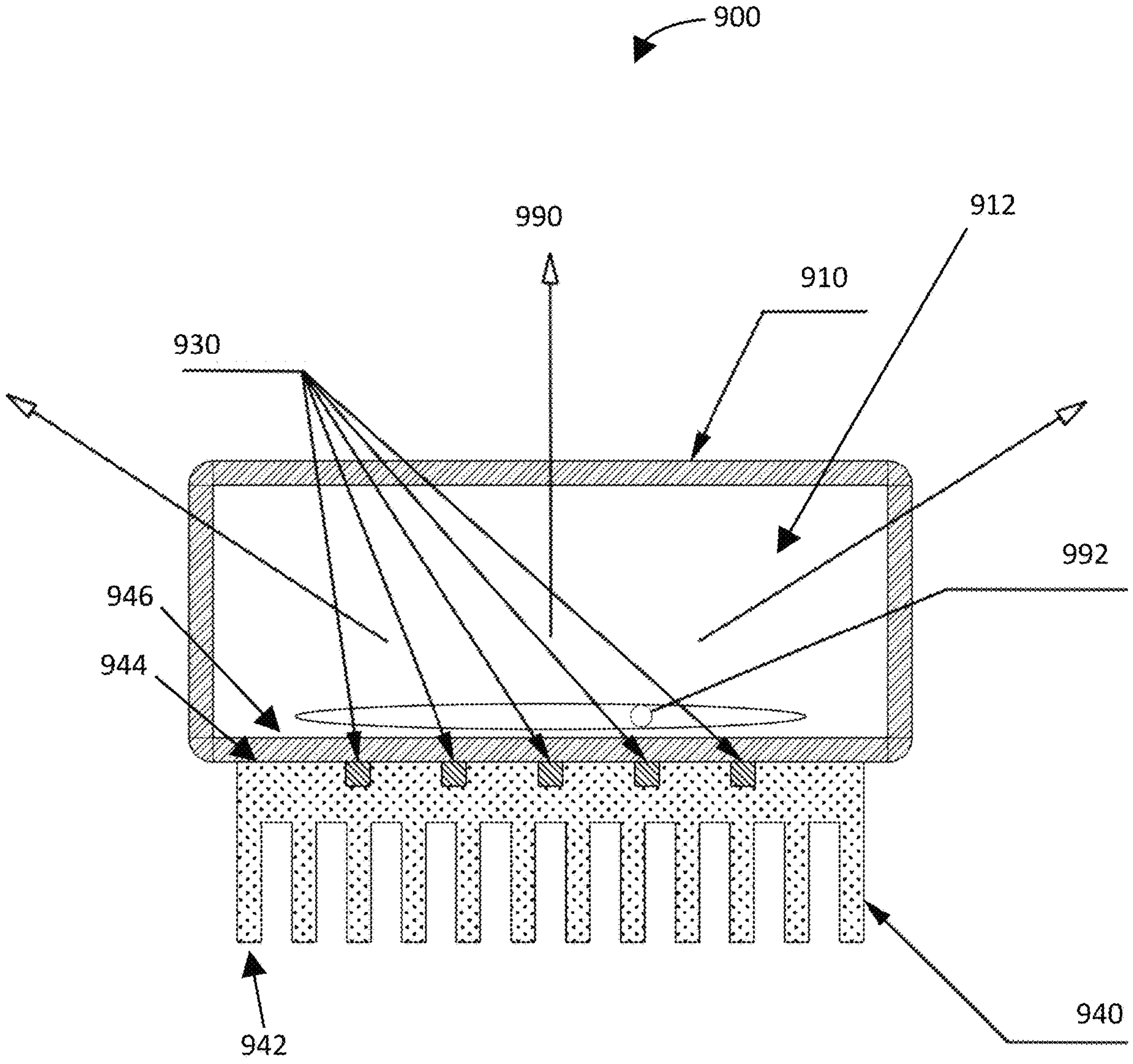

FIG. 9 illustrates an excimer lamp 900 in accordance with some embodiments. The excimer lamp 900 includes an enclosure 910 that also acts as a bulb and has a mostly rectangular shape, and electrodes 930 and a heat sink 940 that are disposed (e.g., located, positioned) on one side of the bulb 910 and is external to the bulb 910. The heat sink 940 includes one or more first surfaces 942 that faces an environment outside the bulb 910 and one or more second surfaces 944 facing the electrodes 930 or the region 392 near the electrodes 930. In some embodiments, the excimer lamp 900 may also include one or more surfaces 946 (such as reflective surfaces) that act as reflectors of UV light 990 to increase overall efficiency of the excimer lamp 900.

As shown in FIG. 9, in some embodiments, the electrodes 930 are at least partially embedded in the heat sink 940, on the side of the heat sink 940 that faces the bulb 910. Additional details regarding the enclosure and the electrodes 930 are provided above with respect to the bulb 810, the electrodes 830 and the heat sink 840 (respectively) shown in FIG. 8, and are not repeated here for brevity.

Additional aspects of the bulb 910, the electrodes 930, and the heat sink 940 can be similar to the enclosure 810, the electrodes 830, and the heat sink 840, (respectively) shown in FIG. 8 and are not repeated here for brevity.

Additional aspects of the one or more first surfaces 942, the one or more second surfaces 944, and the one or more surfaces 946 can be similar to the one or more first surfaces 842, the one or more second surfaces 844, and the one or more surfaces 846 (respectively) shown in FIG. 8 and are not repeated here for brevity.

Referring to the embodiments of excimer lamps described above with respect to FIGS. 3-9, in some embodiments, the enclosure (such as enclosures 310, 410, 510, 610, 710, 810 or 910 shown in FIGS. 3-9, respectively)) is designed to: (1) minimize the generation of byproducts in the air, (2) control the temperature of the various components of the excimer lamp to maximize its lifespan and efficiency, and (3) allow safe handling of the device (e.g., excimer lamp) without requiring additional safety enclosure.

In some embodiments, to achieve the three objectives above, the excimer lamp according to some embodiments uses integrated heat sinks made of material(s) with high thermal conductivity to remove (e.g., transfer, draw, dissipate) heat away from the bulb, the electrodes and/or the enclosed space. In some embodiments, the heat sink (such as heat sink(s) 340, 440, 540, 640, 740, 840, and 940, shown in FIGS. 3-9) has a large external surface area to facilitate dispersion of heat into the surrounding atmosphere. Sometimes large internal surface area in contact with a heat source is also enlarged by wrapping the heat sink around multiple sides of an electrode to facilitate heat transfer from the heat source to the external environment of the enclosure (e.g., external of the excimer lamp). In some embodiments, the excimer lamp includes one or more bulbs. In some embodiments, the excimer lamp includes a plurality of bulbs. Examples of excimer lamps that include one or more bulbs are provided above with respect to FIGS. 3-6, 8, and 9. An example of an excimer lamp that includes a plurality of bulbs is provided above with respect to FIG. 7.

Referring to the embodiments of excimer lamps described above with respect to FIGS. 3-9, in some embodiments, the electrodes can be in the form of a thin metal strip, metal block, or a deposited conductive film or block made of graphite/carbon fiber. Usually, the electrodes are made of material that has excellent thermal conductivity, and each of the electrodes are tightly pressed against a material of the heat sink that has good thermal conductivity to effectively transfer the heat away from each of the electrode, resulting in significantly lower electrode temperature. The lower electrode temperature reduces the temperature on the quartz wall of the lamp, resulting in less reaction between chlorine and the quartz material. In some embodiments, the electrodes are made from a block of bronze/brass/graphite material where the surface area in contact with the quartz bulb (where most of the heat is generated) is much smaller compared to the surface area in contact with the heat sink or the enclosure. Coupled with the high thermal conductivity of the bronze/brass/graphite material, the heat dispersion capability this type of electrode is orders of magnitudes better than a conventional meshed electrode design. In some embodiments, the electrode is either made of and/or closely coupled with a material of the heat sink that has good thermal conductivity. In some embodiments, the voltage between electrodes can be in the range of 5,000V-15,000V, depending on the distance between the electrodes and the gas pressure (e.g., gas pressure inside the bulb).

Referring to the embodiments of excimer lamps described above with respect to FIGS. 3-9, in some embodiments, the one or more heat sinks is composed of (e.g., includes) aluminum oxide ($AlO_3$), which is relatively inexpensive. In some cases, other more expensive ceramics with better heat conduction are used. The material of the one or more heat sinks can include a first class of materials that include materials that are good conductors of heat and electricity (e.g., high heat conductivity and high electrical conductivity). For example, the first class of materials can include a metal, such as aluminum (200 W·m−1·K−1), copper (>300 W·m−1·K−1), brass (>109 W·m−1·K−1), bronze (>189 W·m−1·K−1), or a graphite/carbon fiber material (120-3500 W·m−1·K−1). The material of the one or more heat sinks can include a second class of materials that includes materials that are a good conductor of heat and a good insulator of electricity (e.g., high heat conductivity and low electrical conductivity). For example, the second class of materials can include any of: aluminum oxide (alumina) ceramic (14-30 $W \cdot m^{-1} \cdot K^{-1}$), boron nitride ceramic (121 $W \cdot m^{-1} \cdot K^{-1}$), aluminum nitride ceramic (170-230 $W \cdot m^{-1} \cdot K^{-1}$), silicon carbide (130 $W \cdot m^{-1} \cdot K^{-1}$), silicon nitride (18-30 $W \cdot m^{-1} \cdot K^{-1}$), beryllium oxide (320 $W \cdot m^{-1} \cdot K^{-1}$), yttria oxide (10-14 $W \cdot m^{-1} \cdot K^{-1}$), and thermally-conductive epoxy. The second class of material has distinct advantage of being good electrical insulator, which when implemented as shown can remove the need for separate protection cage around (e.g., surrounding) the electrodes due to high voltage applied across (e.g., at) the electrodes. Both the first class of materials and the second class of materials include materials that have thermal conductivities that are at least one order of magnitude higher than air (0.02 $W \cdot m^{-1} \cdot K^{-1}$) and water (0.6 $W \cdot m^{-1} \cdot K^{-1}$), and therefore is much better at reducing temperature of the excimer bulb. An example of heat sink(s) that are composed of (e.g., includes) aluminum oxide ($AlO_3$) are provided above with respect to FIG. 4. Examples of heat sink(s) that are composed of (e.g., includes) ceramic are provided above with respect to FIGS. 3 and 5-9.

Referring to the embodiments of excimer lamps described above with respect to FIGS. 3-7, in some embodiments, the one or more windows is composed of (e.g., includes) a glass material, such as quartz. Quartz material manufacturing and handling requires special equipment and skillset, due to its very high meting point (>1600 Celsius) and the effect of the manufacturing process on its optical properties. It is therefore labor intensive and costly to manufacture excimer bulbs, especially the coaxial type bulbs.

Referring to the embodiments of excimer lamps described above with respect to FIGS. 3-9, in some embodiments, the bulb is constructed from a single quartz cylinder, which is easier to make than even the traditional 254 nm UV bulbs, resulting in significant cost reduction. In some embodiments, the bulb may have (e.g., include) a reflective coating (to form a reflective surface) on one side to control the direction of UV irradiation (e.g., the UV light).

Referring to the embodiments of excimer lamps described above with respect to FIGS. 3-9, in some embodiments, the enclosure (such as enclosures 310, 410, 510, 610, and 710, shown in FIGS. 3-7) includes one or more vent holes or gaps (such one or more vent holes or gaps 360, 460, 560, and 660, shown in FIGS. 3-6 that allow the equalization of air pressure inside/outside the enclosure. For example, the one or more vent holes or gaps may have a very small size, such as 1 $mm^2$ or smaller. The one or more vent holes of gaps may be part of the one or more windows or part of the heat sink(s).

FIG. 10 illustrates a perspective view of the excimer lamps 300 (or 400) shown in FIG. 3 (or FIG. 4), respectively, in accordance with some embodiments.

Figure 11:
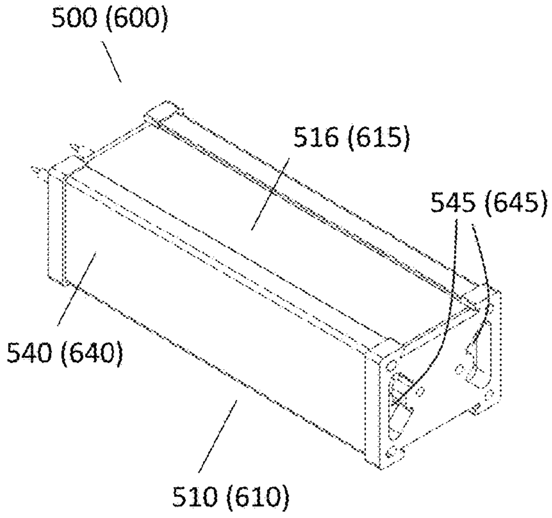

FIG. 11 illustrates a perspective view of the excimer lamps 500 (or600) shown in FIG. 5 (or 6), respectively, in accordance with some embodiments. In some embodiments, such as when at least two of the one or more windows (e.g., one or more windows 516 and 616 shown in FIGS. 5 and 6, respectively) is are configured to transmit UV light (e.g., UV light 590 and 690 shown in FIGS. 5 and 6, respectively), the excimer lamps 500 and 600 may have an external form factor as shown in FIG. 11

Figure 12:
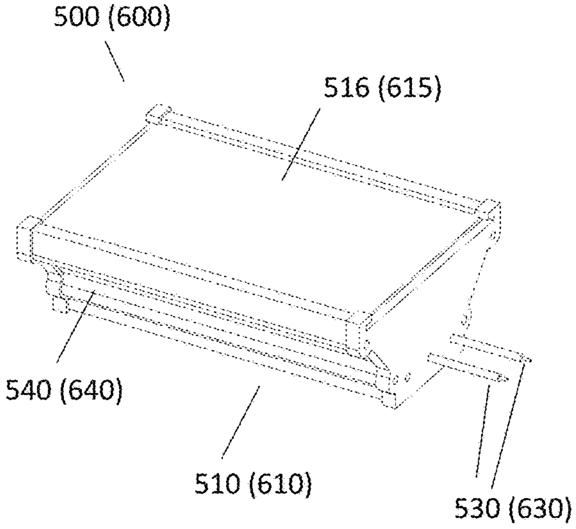

FIG. 12 illustrates a perspective view of the excimer lamps 500 and 600 shown in FIGS. 5 and 6, respectively, in accordance with some embodiments. In some embodiments, such as when one of the one or more windows (e.g., windows 516 and 616 shown in FIGS. 5 and 6) is blocked (e.g., non-transmissive) or not provided, the excimer lamps 500 and 600 may have an external form factor as shown in FIG. 12

Figure 13:
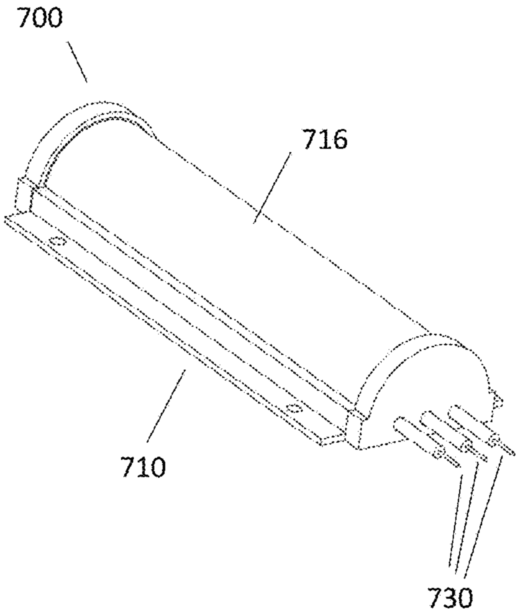

FIG. 13 illustrates a perspective view of the excimer lamp 700 shown in FIG. 7, in accordance with some embodiments.

Figure 14:
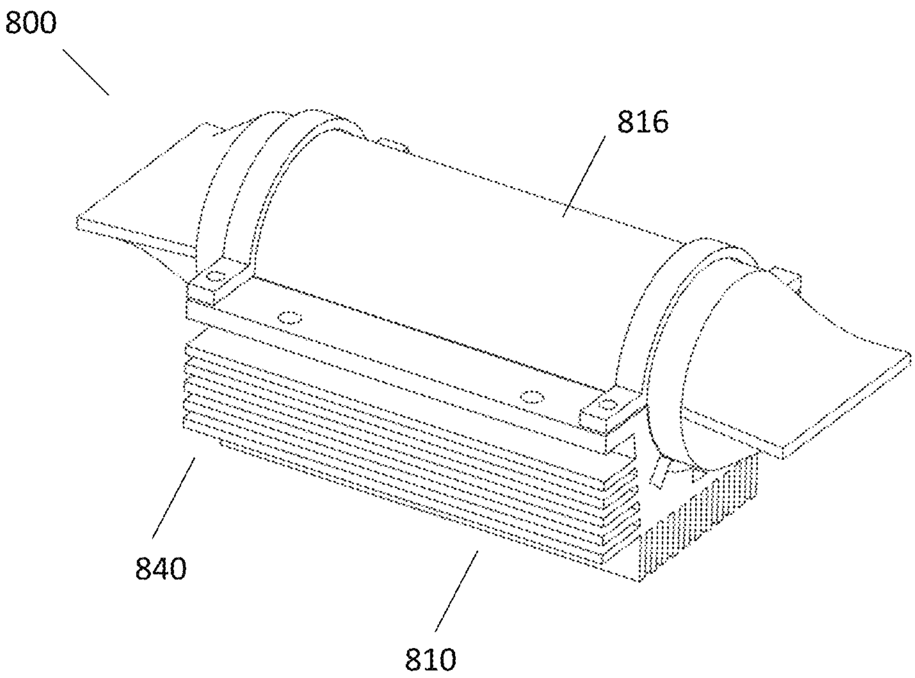

FIG. 14 illustrates a perspective view of the excimer lamp 800 shown in FIG. 8, in accordance with some embodiments. The heat sink 840 of the excimer lamp 800 is shown in the perspective view provided in FIG. 14.

Figure 15:
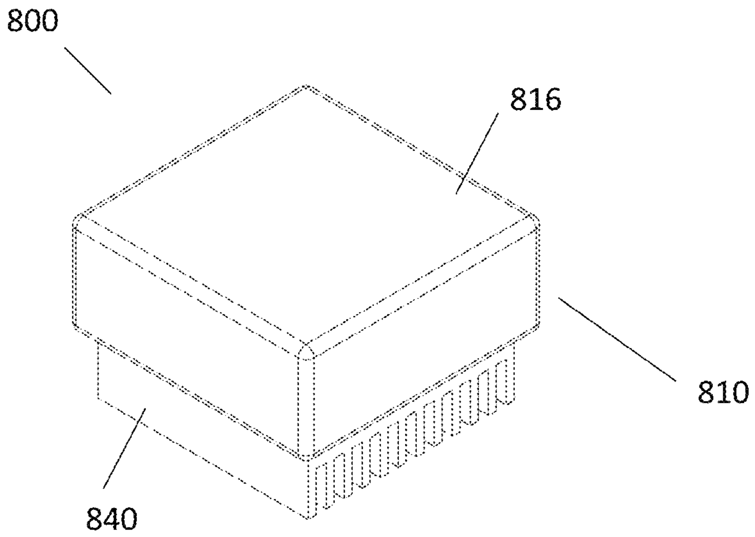

FIG. 15 illustrates a perspective view of the excimer lamp 900 shown in FIG. 9, in accordance with some embodiments.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An excimer lamp, comprising:

an enclosure having one or more windows that allow UV light to pass through and exit the excimer lamp, the enclosure forming an enclosure of, or enclosing, a UV bulb, wherein, in a cross section of the excimer lamp perpendicular to a longitudinal direction of the excimer lamp, the UV bulb has a circular circumference;

electrodes each extending along the longitudinal direction of the excimer lamp and distanced from the one or more windows such that UV light generated in one or more UV generating regions near the electrodes travels a predetermined minimum distance of at least 2 cm before exiting the enclosure through the one or more windows, the electrodes including first and second electrodes of opposite polarities, wherein, in the cross section of the excimer lamp, the first electrode abuts a first arc of the circular circumference and the second electrode abuts a second arc of the circular circumference, the second arc being distinct and apart from the first arc; and a heat sink extending along the longitudinal direction of the excimer lamp and having first surfaces facing an environment outside the enclosure and second surfaces extending along the longitudinal direction of the excimer lamp, each of the second surfaces facing a respective one of the electrodes and/or a respective one of the one or more UV generating regions, and each of the electrodes abuts at least one of the second surfaces, wherein the heat sink is configured to receive heat from the electrodes and/or the one or more UV generating regions through the second surfaces and to conduct the heat to the environment outside the enclosure through the first surfaces, the first surfaces having a total area that is at least twice a total area of the second surfaces.

2. The excimer lamp of claim 1, wherein the one or more first surfaces has an area that is at least 5 times an area of the one or more second surfaces.

3. The excimer lamp of claim 1, wherein the enclosure encloses the UV bulb and an additional UV bulb, and the electrodes further include a third electrode, wherein, in the cross section of the excimer lamp, the additional UV bulb has a circular circumference, the third electrode abuts a third arc of the circular circumference of the additional UV bulb, and another one of the electrodes having an opposite polarity from that of the third electrode abuts a fourth arc of the circular circumference of the additional UV bulb.

4. The excimer lamp of claim 1, wherein the enclosure is part of the UV bulb and the electrodes further include a third electrode, wherein, in the cross section of the excimer lamp, the third electrode abuts a third arc of the circular circumference, the third arc being distinct and apart from each of the first and second arcs, and wherein the second electrode is of opposite polarity from, and is disposed between, the first electrode and the third electrode.

5. The excimer lamp of claim 1, wherein the UV bulb includes a single quartz cylinder extending along the longitudinal direction of the excimer lamp and disposed near a central axis of the enclosure, and the heat sink includes first and second parts corresponding, respectively, to the first and second electrodes and wherein, in the cross section of the excimer lamp, the first and second parts of the heat sink are separate from each other and are on opposite sides of the quartz cylinder, and each of the first and second parts of the heat sink has at least one respective second surface abutting a corresponding one of the first and second electrodes and expands radially from the at least respective one second surface toward an outer perimeter of the enclosure.

6. The excimer lamp of claim 5, wherein the one or more windows and the first and second parts of the heat sink form a perimeter of the enclosure around the quartz cylinder, the one or more windows including first and second windows, and wherein, in the cross section of the excimer lamp, each of the first and second windows has opposite edges respectively connected to the first and second parts of the heat sink.

7. The excimer lamp of claim 6, wherein the enclosure provides a fully enclosed space around the one or more UV generating regions except one or more holes or gaps that allow equalization of air pressure inside and outside the enclosure, wherein the holes or gaps include a gap between a part of the heat sink and a window of the one or more windows, and wherein each of the one or more holes or gaps is greater than about 0.01 $mm^2$ and less than about 1 $mm^2$ in size.

8. The excimer lamp of claim 5, wherein the quartz cylinder has a reflective coating on one side to control directions of UV irradiation.

9. The excimer lamp of claim 1, wherein the heat sink has surfaces facing an interior of the enclosure and coated with one or more UV reflective materials to provide specular or diffused reflection of the UV light generated in the one or more UV generating regions.

10. The excimer lamp of claim 1, wherein at least one of the electrodes includes a thin metal strip, metal block, a deposited conductive film or block made of a conductive material that is pressed against an insulator material of the heat sink.

11. The excimer lamp of claim 1, wherein each of the electrodes includes a block of electrically conductive material, the heat sink including first and second recesses, each recess of the first and second recesses having a bottom surface at a bottom of the recess and one or more sidewall surfaces surrounding the recess, wherein, in the cross section of the excimer lamp perpendicular to the longitudinal direction, the first and second recesses have openings facing the first and second arcs of the circular circumference, respectively, the first electrode is at least partially embedded in the first recess and the second electrode is at least partially embedded in the second recess, each of the first and second electrodes having a first electrode surface protruding out of or exposed at the opening of a respective recess of the first and second recesses and second electrode surfaces in thermal contact with the one or more sidewalls and the bottom surface of the respective recess, the first electrode surface facing the UV bulb and having a first surface area, the plurality of second electrode surfaces having a second surface area, the first surface area being smaller than the second surface area.

12. The excimer lamp of claim 1, wherein the heat sink includes a metal heat sink and a thermally conducting and electrically insulating buffer between one of the electrodes and the metal heat sink, and wherein the buffer provides one or more of the second surfaces in thermal contact with the one of the electrodes and one or more additional surfaces facing an interior of the enclosure.

13. The excimer lamp of claim 12, wherein each of the one or more additional surfaces extends from the one of the electrodes toward a corresponding edge of one of the one or more windows to provide a creeping distance between the electrodes and an exterior surface of the enclosure, the creeping distance being sufficiently large to ensure high-voltage safety in accordance with an applicable standard.

14. The excimer lamp of claim 1, wherein the heat sink includes a ceramic piece having third surfaces facing an interior of the enclosure, the third surfaces including parabolic surfaces coated with a reflective material and configured to redirect UV light emitted from the UV bulb toward a window on one side of the enclosure, the one or more parabolic surfaces having a focal axis in the UV bulb.

15. The excimer lamp of claim 1, wherein the heat sink includes a ceramic piece and at least one of the electrodes includes a metal film plated on a surface of the ceramic piece facing one of the one or more UV generating regions.

16. The excimer lamp of claim 1, wherein at least one of the electrodes includes a metal film plated on a surface of the at least one UV bulb.

17. The excimer lamp of claim 1, wherein the UV bulb is disposed near a central axis of the enclosure and, in the cross section of the excimer lamp: the first and second electrodes are on opposite sides of the UV bulb, the one or more windows include first and second windows on opposite sides of the enclosure, the heat sink includes first and second parts on opposite sides of the enclosure, and each part of the first and second parts expands radially from a side in thermal contact with a corresponding one of the first and second electrodes toward a corresponding portion of an outer perimeter of the enclosure between the first window and the second window.

18. The excimer lamp of claim 17, wherein the first electrode is at least partially embedded in the first part of the heat sink and the second electrode is at least partially embedded in the second part of the heat sink.

19. The excimer lamp of claim 17, wherein the heat sink has one or more hollow regions, and each hollow region is inside a block of thermally conductive material and in fluid communication with the environment outside the enclosure.

20. The excimer lamp of claim 19, wherein the each hollow region extends along the longitudinal direction of the excimer lamp between a first end and a second end of the excimer lamp and has at least one opening at the first end and/or the second end that allows fluid communication between the hollow region and the environment outside the excimer lamp, and wherein the hollow region is surrounded by the block of thermally conductive material except the at least one opening.

* * * * *